(12) United States Patent
Rosebrock et al.

(10) Patent No.: US 12,473,072 B2
(45) Date of Patent: Nov. 18, 2025

(54) AIRCRAFT STRUCTURE

(71) Applicants: Airbus Operations GmbH, Hamburg (DE); Airbus Operations (S.A.S.), Toulouse (FR)

(72) Inventors: Sven Rosebrock, Hamburg (DE); Bernward Mons, Hamburg (DE); Henning Everth, Hamburg (DE); Jörg Schwickert, Hamburg (DE); Patrick Lieven, Toulouse (FR)

(73) Assignees: Airbus Operations GmbH, Hamburg (DE); Airbus Operations (S.A.S.), Toulouse (FR)

( * ) Notice: Subject to any disclaimer, the term of this patent is extended or adjusted under 35 U.S.C. 154(b) by 211 days.

(21) Appl. No.: 17/558,050

(22) Filed: Dec. 21, 2021

(65) Prior Publication Data
US 2022/0194548 A1 Jun. 23, 2022

(30) Foreign Application Priority Data
Dec. 23, 2020 (DE) ...................... 10 2020 134 902.5

(51) Int. Cl.
*B64C 1/06* (2006.01)
*B64C 1/00* (2006.01)
*B64D 13/06* (2006.01)

(52) U.S. Cl.
CPC ............... *B64C 1/069* (2013.01); *B64C 1/06* (2013.01); *B64D 13/06* (2013.01); *B64C 2001/0072* (2013.01); *B64D 2013/0655* (2013.01)

(58) Field of Classification Search
CPC ............ B64D 13/06; B64D 2013/0625; B64D 2013/0655
See application file for complete search history.

(56) References Cited

U.S. PATENT DOCUMENTS 2,149,844 A * 3/1939 George ...................... B64C 1/08
285/133.11
8,191,820 B1 6/2012 Westra et al.
(Continued)

FOREIGN PATENT DOCUMENTS

CN 111788116 A 10/2020
DE 14 81 622 A 1/1970
(Continued)

OTHER PUBLICATIONS

German Search Report for Application No. 102020134902 dated Nov. 30, 2021.
(Continued)

*Primary Examiner* — Nicholas McFall
*Assistant Examiner* — Eric Acosta
(74) *Attorney, Agent, or Firm* — KDW Firm PLLC (57) ABSTRACT

An aircraft structure which extends along a longitudinal axis, a lateral axis and a vertical axis, wherein the aircraft structure includes an upper shell and a lower shell that together surround an interior compartment designed for accommodating an aircraft cabin, and a pillar arrangement with at least one support pillar which extends through the interior compartment and connects the upper shell to the lower shell and supports same in relation to each other. An aircraft structure can be provided which is particularly efficient, in particular has a low weight and requires little space and outlay on assembly is achieved in that the interior of the support pillar has at least one flow duct for the conduction of air-conditioned air.

13 Claims, 5 Drawing Sheets

(56) References Cited

U.S. PATENT DOCUMENTS

| | | | | |
|---|---|---|---|---|
| 2012/0248244 A1* | 10/2012 | Brownjohn | ............. | B64C 1/064 |
| | | | | 244/118.5 |
| 2015/0168039 A1* | 6/2015 | Kelnhofer | ............... | F25B 49/02 |
| | | | | 62/208 |
| 2017/0297291 A1 | 10/2017 | Lai | | |
| 2019/0300139 A1* | 10/2019 | Schroeder | .............. | B64D 13/06 |

FOREIGN PATENT DOCUMENTS

| | | | | |
|---|---|---|---|---|
| EP | 3378788 A1 * | 9/2018 | ............... | B64C 1/06 |
| EP | 3 546 362 A1 | 10/2019 | | |
| WO | 2019170302 A1 | 9/2019 | | |

OTHER PUBLICATIONS

Flightglobal, "Kawasaki BK-117 C-2 Cutaway Poster," 2000. http://www.flightglobalimages.com/cutaways/cutaway-posters/kawaski-bk-117-c-2-cutaway-poster.

European Search Report for Application No. 21215139 dated Apr. 20, 2022.

Chinese Office Action in CN Application No. 202111584157.X, dated Mar. 29, 2025, 8 pages.

\* cited by examiner

AIRCRAFT STRUCTURE

CROSS-REFERENCE TO RELATED APPLICATION

This application claims priority to German Patent Application No. 10 2020 134 902.5 filed Dec. 23, 2020, the entire disclosure of which is incorporated by reference herein.

TECHNICAL FIELD

The disclosure herein relates to an aircraft structure, in particular for an aircraft with an interior compartment of large width, such as, for example, a flying wing aircraft or aircraft similar to a flying wing aircraft. A further aspect of the disclosure herein relates to an aircraft with such an aircraft structure.

BACKGROUND

The aircraft structure extends along or parallel to a longitudinal axis, preferably from a nose as far as a rear, a lateral axis, preferably between two opposite wing tips, and a vertical axis, preferably between an upper side and a lower side. The aircraft structure comprises an upper shell in the region of the upper side and a lower shell in the region of the lower side that together, i.e. from above by the upper shell and from below by the lower shell, surround an interior compartment which is designed for accommodating an aircraft cabin. The aircraft structure furthermore comprises a pillar arrangement with at least one support pillar which extends through the interior compartment and connects the upper shell to the lower shell and supports same in relation to each other, wherein the at least one support pillar is preferably attached at an upper end to the upper shell and at a lower end to the lower shell. The term "support" or "supporting" is understood in conjunction with the disclosure herein as meaning that not only is the transmission of compressive forces, but also the transmission of tensile forces included.

Similar aircraft structures are known from the prior art. In particular it is known, in the case of flying wing aircraft or similar aircraft with a very wide interior compartment in comparison to conventional passenger aircraft, to provide a pillar arrangement in the centre of the interior compartment in order to support the upper shell on the lower shell. In addition, it is known in the case of aircraft of every type to conduct air-conditioned air of the air-conditioning system from below the cabin to above the cabin through corresponding pipes which run between a fuselage structure and a cabin wall. However, such pipes require a relatively large amount of space, an outlay on assembly and involve additional weight, all of which are basically to be minimized in aircraft manufacturing.

SUMMARY

It is therefore an object of the disclosure herein to provide an aircraft structure which is particularly efficient, in particular has a low weight, and requires little space and outlay on assembly.

This object is achieved in that the interior of the support pillar, i.e. of at least one support pillar, preferably of all the support pillars, has at least one flow duct for the conduction of air-conditioned air of an air-conditioning system, wherein the flow duct preferably extends parallel to the longitudinal direction of the support pillar and at least over part of the length of the support pillar between the upper and lower end. In this way, the flow duct for air-conditioned air is therefore integrated in the support pillar. Separate air-conditioning pipes between cabin wall and outer skin are no longer required, and therefore space, weight and outlay on assembly can be saved.

In a preferred embodiment, the at least one support pillar, preferably all the support pillars of the pillar arrangement, extends in a longitudinal central plane defined by the longitudinal axis and the vertical axis, and/or is intersected by the longitudinal axis. The upper shell and the lower shell are thereby supported on each other in a central and preferably symmetrical position, which is particularly effective.

In a further preferred embodiment, the at least one support pillar, preferably all the support pillars of the pillar arrangement, extends parallel to the vertical axis. In this way, forces can be transmitted particularly effectively and the interior compartment is minimally adversely affected by the support pillar.

In a further preferred embodiment, the interior of the at least one support pillar, preferably of all the support pillars of the pillar arrangement, has at least two flow ducts, preferably four flow ducts. Preferably, in each case one flow duct, preferably in each case two flow ducts are provided here for different air-conditioning zones. In this way, different air-conditioned air having different properties, for example different temperatures or a different moisture content, can be transported and a plurality of air-distributing ducts can be supplied with different air-conditioned air.

It is particularly preferred here if at least one support pillar, preferably all the support pillars of the pillar arrangement, has a round, in particular circular, cross section. Preferably, at least two, preferably four flow ducts are arranged next to one another here, in particular in a square shape, in two rows each having two flow ducts. In this way, the flow ducts can be arranged in a particularly space-efficient manner in the support pillar, with the support pillar having a minimal diameter.

Alternatively, it is preferred if the at least one support pillar, preferably all the support pillars of the pillar arrangement, has an elongate, in particular oval or rectangular, cross section. At least two, preferably four flow ducts are arranged in a row next to one another here. In this way, the flow ducts can be arranged in a particularly space-efficient manner in the support pillar, with the support pillar having a minimal width.

In a preferred embodiment, the at least one support pillar, preferably all the support pillars of the pillar arrangement, comprises a support structure for supporting the upper shell in relation to the lower shell, i.e. for transmitting loads, in particular main loads, between the upper shell and the lower shell, and a pipe structure which forms or surrounds the at least one flow duct. The support pillar is therefore divided into two functional components, namely the support structure for transmitting force and the pipe structure for forming the flow duct and therefore for conducting the air-conditioned air.

It is particularly preferred here if the pipe structure is formed integrally with the support structure, i.e. the pipe structure is integrated in the support structure or the support structure itself forms the flow duct. The surface of the support structure or pipe structure that forms the flow duct is particularly smooth and adapted for advantageous flow conditions of the air-conditioned air. This is a particularly simple and efficient design since a separate pipe structure does not have to be produced, fitted and maintained. In addition, further weight and space can be saved.

Alternatively, it is preferred if the pipe structure is formed separately from the support structure. This design has the advantage that the pipe structure can be exchanged or adapted as required without changing the support structure. In addition, for example, standard pipes can be used, and therefore the surface of the support structure or pipe structure that forms the flow duct does not have to be additionally smoothed and machined or optimized for the flow of the air-conditioned air.

It is particularly preferred here if the support structure has at least two chambers which are separated from each other preferably by the material of the support structure. At least one pipe, preferably two pipes, of the pipe structure is arranged in each chamber. The two chambers are preferably assigned to different air-conditioning zones. The two separate chambers here constitute thermal insulation between the pipes of different air-conditioning zones.

In a preferred embodiment, the at least one support pillar, preferably all the support pillars of the pillar arrangement, in particular the support structure, is connected to the upper shell via diagonal support struts. Four support struts are preferably provided and arranged here in such a manner that in each case two support struts are arranged opposite each other, and the support struts are preferably each fastened to the support pillar at a distance of 90° in the circumferential direction around the support pillar. However, other distances are also possible. In this way, the introduction of force from the support strut into the upper shell is distributed over a plurality of points and the support strut is support against transverse forces and bending. In addition, it is possible to provide a fifth support strut which is connected to the upper shell centrally between the four diagonal support struts and in particular transmits longitudinal forces between the support pillar and the upper shell.

In a preferred embodiment, the at least one support pillar, preferably all the support pillars of the pillar arrangement, in particular at least the support structure, is formed from fiber composite material, preferably from cured prepreg layers or from dry fiber layers which are provided with resin in a resin infusion process and cured. Such a fiber composite design is particularly light and firm. By a construction with prepreg layers or dry fiber layers, different layers can be used for different functions, for example for the separation between the two chambers, for forming connection elements for the connection of the support struts, or as a local reinforcement.

A further aspect of the disclosure herein relates to an aircraft, preferably with an interior compartment of large width, such as, for example, a flying wing aircraft or aircraft similar to a flying wing aircraft, comprising an aircraft structure according to one of the previously described embodiments. The features and effects explained previously in conjunction with the aircraft structure are vis a vis applicable and preferred in conjunction with the aircraft.

In a preferred embodiment, the aircraft furthermore comprises an aircraft cabin in the interior compartment of the aircraft structure, an air-conditioning system with an air outlet for providing air-conditioned air, in particular for supplying the aircraft cabin, and at least one air-distributing duct, preferably an air-distributing duct network which is preferably arranged on or in the ceiling of the aircraft cabin, with openings to the cabin compartment for distributing air-conditioned air in the aircraft cabin. The air outlet of the air-conditioning system is connected to an inlet of the flow duct, preferably at the lower end of the support pillar. The air-distributing duct is connected to an outlet of the flow duct, preferably at the upper end of the support pillar. A covering is preferably provided around the at least one support pillar, preferably around all the support pillars of the pillar arrangement. The covering peripherally covers the support pillar, in particular the support structure and the support struts, and insulates same in terms of heat and sound in relation to the aircraft cabin. With such an arrangement, the air-conditioned air can be conducted from the air-conditioning system through the flow duct in the support pillar upward to the air-distributing duct and can be distributed by the latter in the aircraft cabin.

It is particularly preferred here if the air-conditioning system is configured for providing different air-conditioned air of different air-conditioning zones, wherein the air-conditioning system has a first air outlet for providing first air-conditioned air for a first air-conditioning zone and a second air outlet for providing second air-conditioned air for a second air-conditioning zone. The first air outlet is connected to an inlet of a first flow duct for the first air-conditioning zone, and the second air outlet is connected to an inlet of a second flow duct for the second air-conditioning zone. A first air-distributing duct for the first air-conditioning zone is connected to an outlet of the first flow duct, and a second air-distributing duct for the second air-conditioning zone is connected to an outlet of the second flow duct. In this way, two different air-conditioning zones can be realized in the aircraft cabin by the two air-distributing ducts, with only one support pillar being used for the conduction of the two different air-conditioned air. Preferably, a total of four air-conditioning zones are provided analogously to the first and second air-conditioning zones described here.

BRIEF DESCRIPTION OF THE DRAWINGS

Example embodiments of the disclosure herein will be explained in more detail below with reference to a drawing. In the drawings.

DETAILED DESCRIPTION

Figure 1:
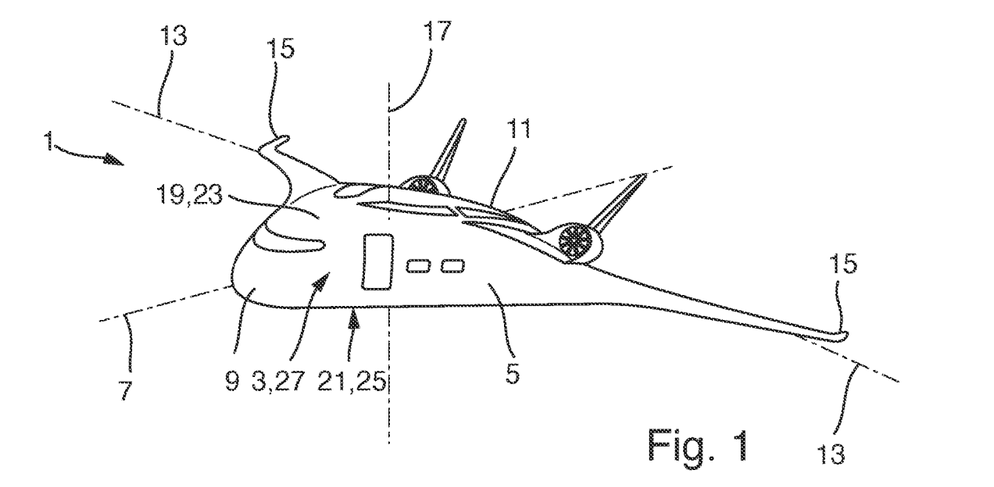
FIG. 1 shows an aircraft according to one embodiment of the disclosure herein.

FIG. 1 illustrates an aircraft 1 according to one example embodiment of the disclosure herein. The aircraft 1 is an aircraft similar to a flying wing aircraft with an interior compartment 3 of large width.

The aircraft 1 comprises an aircraft structure 5 which extends along or parallel to a longitudinal axis 7 from a nose 9 as far as a rear 11, a lateral axis 13 between two opposite wing tips 15, and a vertical axis 17 between an upper side 19 and a lower side 21. The aircraft structure 5 comprises an upper shell 23 in the region of the upper side 19 and a lower shell 25 in the region of the lower side 21 that together surround an interior compartment 3 which is designed for accommodating an aircraft cabin 27. The aircraft structure 5 furthermore comprises a pillar arrangement 29 with a plurality of support pillars 31 which extend through the interior compartment 3 and connect the upper shell 23 to the lower shell 25 and support same in relation to each other or hold same on each other. The interior of the support pillars 31 has flow ducts 33 for the conduction of air-conditioned air of an air-conditioning system 35 which extends parallel to the longitudinal direction of the support pillars 31, as shown in FIG. 2.

Figure 2:
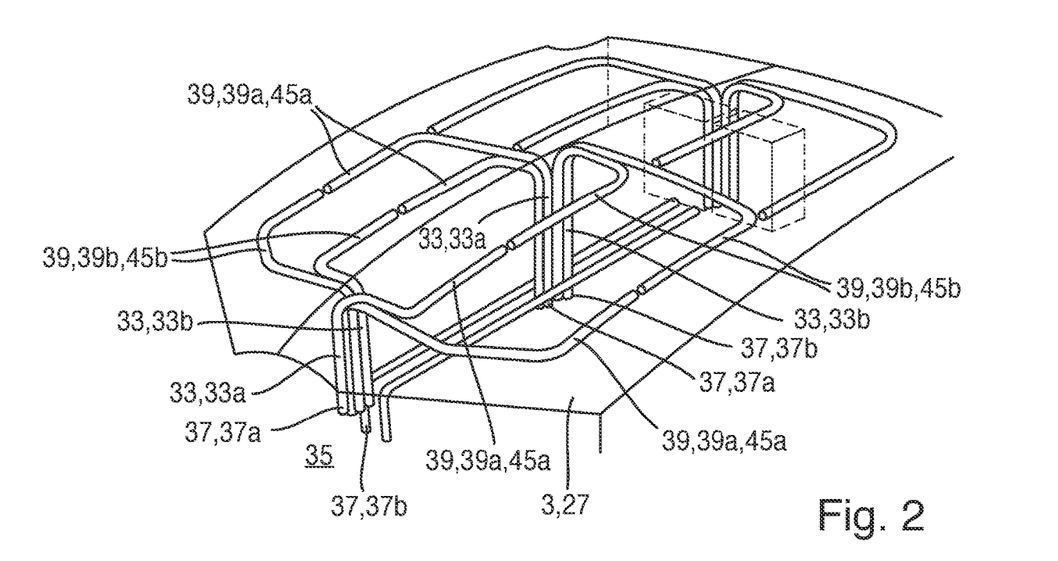
FIG. 2 shows a perspective view of the interior compartment of the aircraft from FIG. 1 looking at the flow ducts and air-distributing ducts for conducting and distributing the air-conditioned air in the interior compartment or in the aircraft cabin.

The aircraft 1 furthermore comprises an aircraft cabin 27 in the interior compartment 3 of the aircraft structure 5, an air-conditioning system 35 with an air outlet 37 for providing air-conditioned air for supplying the aircraft cabin 27, and a plurality of air-distributing ducts 39 which are arranged on or in the ceiling of the aircraft cabin, with openings to the cabin compartment for distributing air-conditioned air in the aircraft cabin 27, as illustrated in FIG. 2. The air outlet 37 of the air-conditioning system 35 is connected to an inlet 39 of the flow ducts 33 at the lower end of the support pillars 31. The air-distributing ducts 39 are connected to outlets 43 of the flow ducts 33 at the upper end of the support pillars 31.

As likewise shown in FIG. 2, the air-conditioning system 35 is configured for providing different air-conditioned air of different air-conditioning zones, wherein the air-conditioning system 35 has a first air outlet 37a for providing first air-conditioned air for a first air-conditioning zone 45a, and a second air outlet 37b for providing second air-conditioned air for a second air-conditioning zone 45b. The first air outlet 37a is connected to an inlet 41 of a first flow duct 33a for the first air-conditioning zone 45a, and the second air outlet 37b is connected to an inlet 41 of a second flow duct 33b for the second air-conditioning zone 45b. A first air-distributing duct 39a for the first air-conditioning zone 45a is connected to an outlet 43 of the first flow duct 33a, and a second air-distributing duct 39a for the second air-conditioning zone 45b is connected to an outlet 43 of the second flow duct 33b. In the present example embodiment from FIG. 2, in addition to the first and second air-conditioning zone a third and a fourth air-conditioning zone are also provided which are formed analogously to the first and second air-conditioning zones.

As can be seen in FIGS. 3 through 6, the interior of the support pillars 31 has four flow ducts 33. In each case two flow ducts 33 are provided here for different air-conditioning zones. In the embodiment shown in FIGS. 3 and 4, the support pillars 31 have a circular cross section. Four flow ducts 33 are arranged next to one another here in a square shape in two rows each having two flow ducts 33. In the alternative embodiment shown in FIGS. 5 and 6, the support pillars 31 have an elongate, oval cross section. In this case, four flow ducts 33 are arranged in a row next to one another. Alternatively, it is, however, also possible for only two flow ducts 33 to be arranged next to each other.

The support pillars 31 comprise a support structure 47 for supporting the upper shell 23 in relation to the lower shell 25, and a pipe structure 49 which forms the at least one flow duct 33. In the example embodiments shown in FIGS. 3 to 6, the pipe structure 49 is formed separately from the support structure 47, wherein the individual pipes of the pipe structure 49 are accommodated in corresponding openings of the support structure 47. The support structure 47 is formed from fiber composite material, in particular from cured prepreg layers.

The support structure 47 has two chambers 51 which are separated from each other by material of the support structure 47, as can be seen in FIGS. 3 through 6. Two pipes 53 of the pipe structure 49 are arranged in each chamber 51. The two chambers 51 are assigned to different air-conditioning zones. In the example embodiments shown in FIGS. 3 through 6, it is likewise possible and preferred that, at least over part of the length of the support pillars 31, the two chambers 51 form the flow ducts 33, and the pipes 53 are connected only subsequent to the chambers, with it being possible for that part of the pipes 53 which extends through the chambers 51 to therefore be saved.

Figure 3:
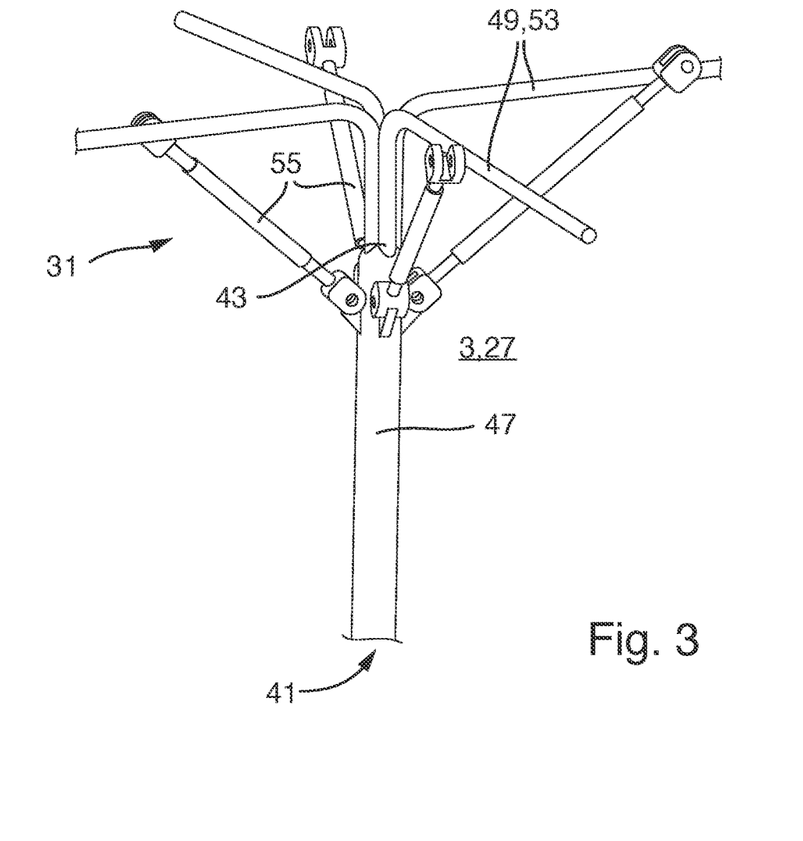
FIG. 3 shows a perspective view of a support pillar according to a first embodiment of the disclosure herein.
Figure 4:
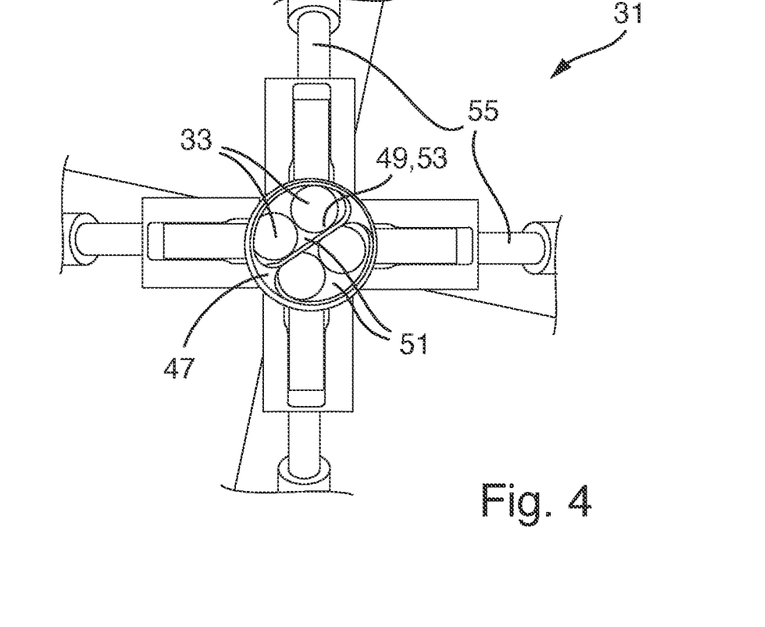
FIG. 4 shows a plan view from below of the support pillar from FIG. 3.
Figure 5:
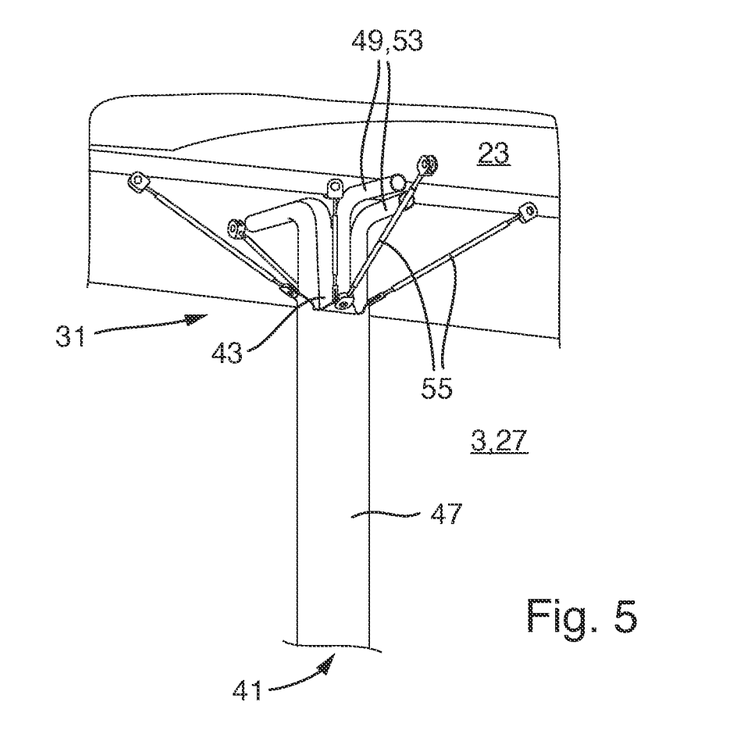
FIG. 5 shows a perspective view of a support pillar according to a second embodiment of the disclosure herein.
Figure 7:
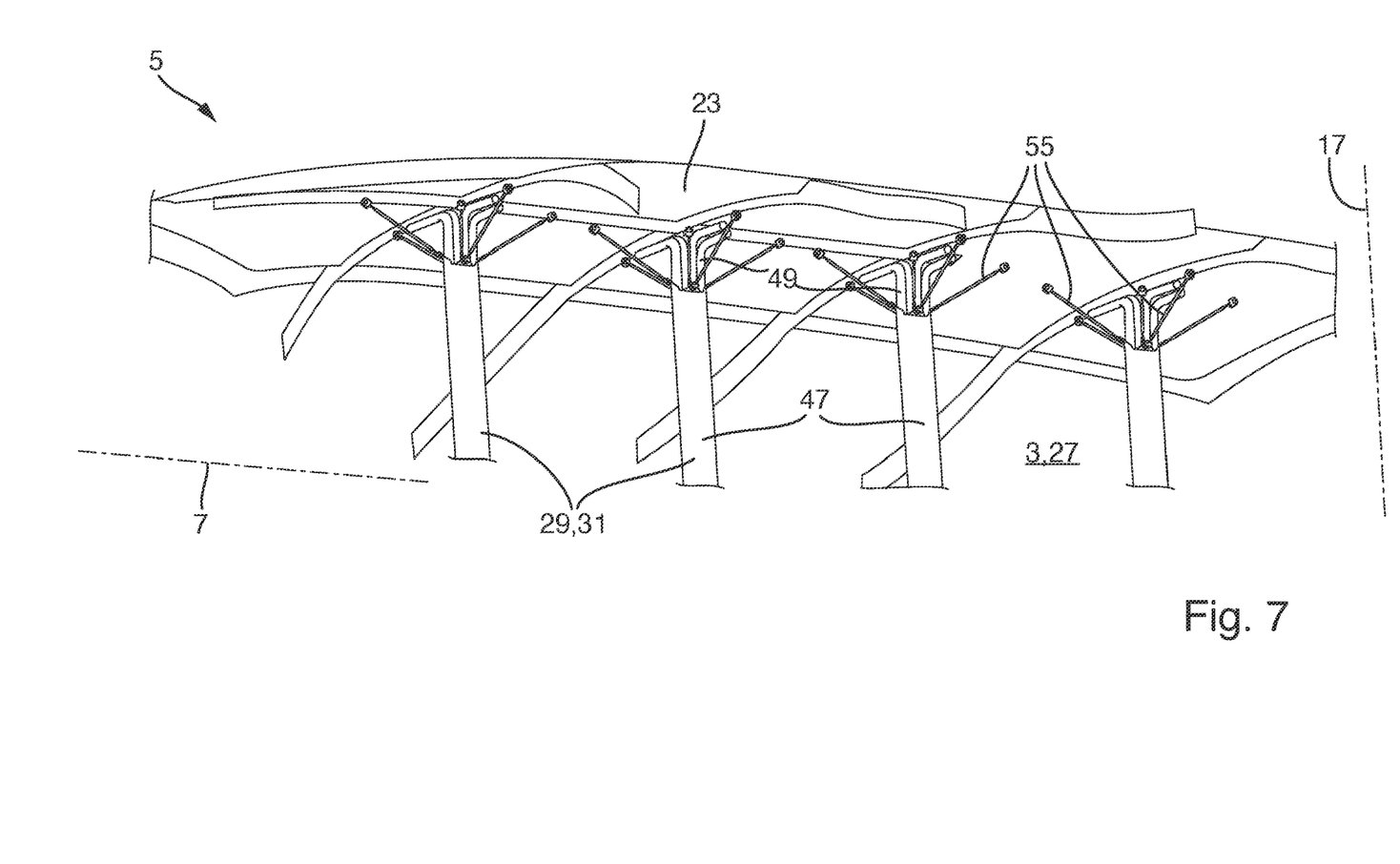
FIG. 7 shows a perspective view of a detail of the aircraft structure of the aircraft from FIG. 1 with four support pillars according to the embodiment from FIG. 5.

As illustrated in FIGS. 3, 5 and 7, the support structure 47 is connected to the upper shell 23 via diagonal support struts 55. Four support struts 55 are provided and arranged here in such a manner that in each case two support struts 55 are arranged opposite each other, and the support struts 55 are each fastened to the support pillar 31 at a distance of 90° in the circumferential direction around the support pillar 31. FIG. 5 additionally illustrates a central support strut 55 which connects the support structure 47 to the upper shell 23 centrally between the diagonal support struts 55.

Figure 6:
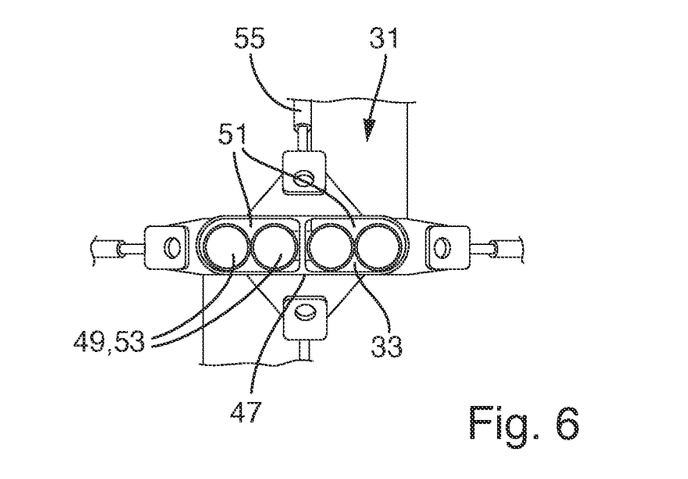
FIG. 6 shows a plan view from below of the support pillar from FIG. 5.

FIG. 7 illustrates a pillar arrangement 29 with four support pillars 31, which are arranged in a row, of the embodiment shown in FIGS. 5 and 6. The support pillars 31 extend in a longitudinal central plane defined by the longitudinal axis 7 and the vertical axis 17. Furthermore, the support pillars 31 extend parallel to the vertical axis 17.

Figure 8:
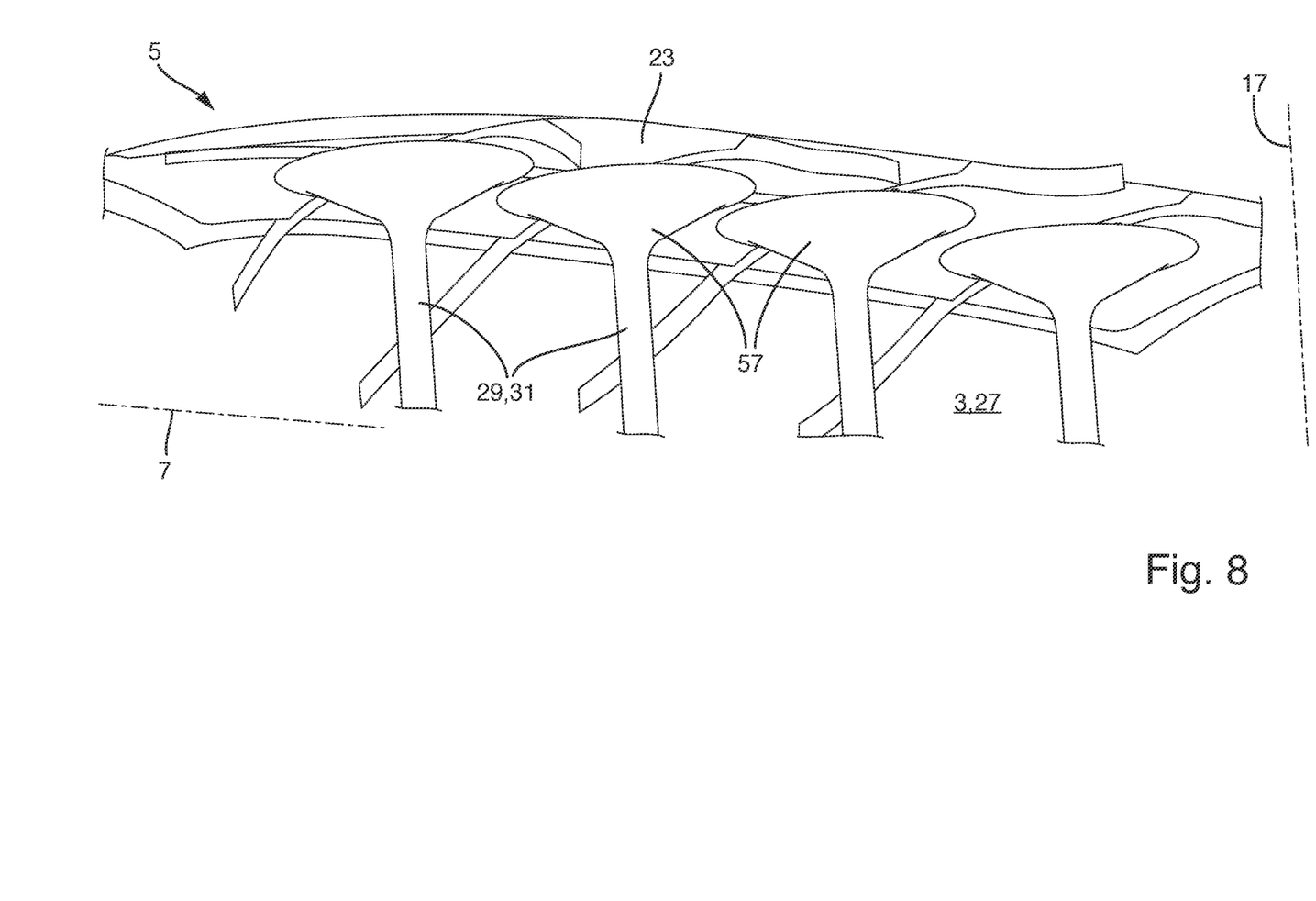
FIG. 8 shows the aircraft structure from FIG. 7 with coverings around the support pillars.

FIG. 8 illustrates the support pillars 31, which are shown in FIG. 7, with a covering 57 which peripherally covers the support structure 47 and the support struts 55 and insulates same in terms of heat and sound in relation to the aircraft cabin 27.

With the disclosure herein described above, the flow duct 33 which is provided for conducting air-conditioned air is integrated in the support pillar 31. Separate air-conditioning pipes between cabin wall and outer skin are no longer required, and therefore space, weight and outlay on assembly can be saved.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft structure which extends along a longitudinal axis, a lateral axis and a vertical axis, the aircraft structure comprising:
   an upper shell and a lower shell that together surround an interior compartment for accommodating an aircraft cabin;
   a pillar arrangement having at least one support pillar which extends through the interior compartment and connects the upper shell to the lower shell, wherein the at least one support pillar extends parallel to the vertical axis in a longitudinal central plane defined by the longitudinal axis and the vertical axis and supports the upper shell in relation to the lower shell in a central and symmetrical position;

wherein one or more of the at least one support pillar comprises:
  a support structure that connects the upper shell to the lower shell for transmitting loads between the upper shell in relation to the lower shell along the longitudinal central plane; and
  a pipe structure arranged within an interior of the support pillar which has at least one flow duct for the conduction of air-conditioned air that extends within the interior of the support pillar.

2. The aircraft structure according to claim 1, wherein the interior of the support pillar has at least four flow ducts.

3. The aircraft structure according to claim 2, wherein the support pillar has a round cross section, and wherein the at least four flow ducts are arranged next to one another in two rows each having two flow ducts.

4. The aircraft structure according to claim 2, wherein the support pillar has an elongate cross section, and wherein the at least four flow ducts are in a row next to one another.

5. The aircraft structure according to claim 1, wherein the pipe structure is formed integrally with the support structure.

6. The aircraft structure according to claim 1, wherein the pipe structure is formed separately from the support structure.

7. The aircraft structure according to claim 6, wherein the support structure has at least two separate chambers, and wherein at least one pipe, or at least two pipes, of the pipe structure is or are arranged in each chamber of the at least two separate chambers.

8. The aircraft structure according to claim 1, wherein the support pillar is connected to the upper shell via diagonal support struts, and wherein four support struts are provided and are arranged such that in each case two support struts are arranged opposite each other.

9. The aircraft structure according to claim 1, wherein the support pillar is formed from fiber composite material.

10. The aircraft structure according to claim 1, wherein the interior of the support pillar has at least two flow ducts.

11. An aircraft comprising an aircraft structure according to claim 1.

12. The aircraft according to claim 11, further comprising:
  an aircraft cabin in the interior compartment of the aircraft structure;
  an air-conditioning system having an air outlet for providing air-conditioned air; and
  at least one air-distributing duct on or in a ceiling of the aircraft cabin for distributing air-conditioned air in the aircraft cabin;
  wherein the air outlet of the air-conditioning system is connected to an inlet of the flow duct; and
  wherein the air-distributing duct is connected to an outlet of the flow duct.

13. The aircraft according to claim 12, wherein the air-conditioning system is configured for providing different air-conditioned air of different air-conditioning zones,
  wherein the air-conditioning system has a first air outlet for providing first air-conditioned air for a first air-conditioning zone and a second air outlet for providing second air-conditioned air for a second air-conditioning zone,
  wherein the first air outlet is connected to an inlet of a first flow duct for the first air-conditioning zone,
  wherein the second air outlet is connected to an inlet of a second flow duct for the second air-conditioning zone,
  wherein a first air-distributing duct for the first air-conditioning zone is connected to an outlet of the first flow duct, and
  wherein a second air-distributing duct for the second air-conditioning zone is connected to an outlet of the second flow duct.

\* \* \* \* \*